United States Patent [19]

Fersht et al.

[11] Patent Number: 4,710,027
[45] Date of Patent: Dec. 1, 1987

[54] METHOD AND APPARATUS FOR MECHANICAL DITHER STABILIZATION OF A LASER ANGULAR SENSOR

[75] Inventors: Samuel N. Fersht; Rena S. Fersht, both of Studio City, Calif.

[73] Assignee: Litton Systems, Inc., Beverly Hills, Calif.

[21] Appl. No.: 864,284

[22] Filed: May 16, 1986

Related U.S. Application Data

[63] Continuation-in-part of Ser. No. 634,324, Jul. 25, 1984, abandoned, which is a continuation-in-part of Ser. No. 574,845, Jan. 30, 1984, abandoned.

[51] Int. Cl.⁴ .................................................. G01C 19/64
[52] U.S. Cl. .................................................. 356/350
[58] Field of Search ........................................ 356/350

[56] References Cited

U.S. PATENT DOCUMENTS

| | | | |
|---|---|---|---|
| 3,373,650 | 3/1968 | Killpatrick | 356/350 |
| 3,467,472 | 9/1969 | Killpatrick | 356/350 |
| 4,179,818 | 12/1979 | Craig | 33/321 |
| 4,277,173 | 7/1981 | Ljung et al. | 356/350 |
| 4,425,040 | 1/1984 | Ljung et al. | 356/350 |
| 4,445,779 | 5/1984 | Johnson | 356/350 |
| 4,597,667 | 7/1986 | Curby et al. | 356/350 |

Primary Examiner—Davis L. Willis
Assistant Examiner—S. A. Turner

[57] ABSTRACT

Three sets of laser angular sensors or masses, corresponding to three angularly disposed sensing planes, are mounted on a common instrument block. A compensating mass, which may be a fourth sensor, is also mounted on said instrument block. Said sensors or masses are supported for angular dithering about predetermined axes. The amplitudes, frequencies and phases of the dithering are adjusted, either by being actively directly driven or by passive mechanical coupling, to balance momenta and torque between said dithered masses. The ditherings of the masses of the sensors are of amplitude and frequency to avoid lock-in of said sensors. One, two, three or four dither mechanisms selectively may simultaneously be energized. The driving dither mechanisms may be switched from one mass to another or from one permutation and combination of masses to another. The switching may be a timed sequence, a random sequence, or a commanded sequence.

35 Claims, 5 Drawing Figures

METHOD AND APPARATUS FOR MECHANICAL DITHER STABILIZATION OF A LASER ANGULAR SENSOR

This is a continuation-in-part of U.S. patent application Ser. No. 634,324, now abandoned filed July 25, 1984 which was a continuation-in-part of patent application Ser. No. 574,845, now abandoned, which was filed Jan. 30, 1984. A PCT application, Ser. No. PCT/US/01397 was also filed ON JULY 23, 1985, claiming the benefit of the filing dates of the above-referenced patent applications. Each of the above-referenced patent applications had the same title and the same inventors as herein.

The present invention relates generally to a laser angular sensor and, more particularly, to an apparatus and method of avoiding certain adverse effects created by mechanical dither of the sensors. Such dithering is used to prevent the frequencies of the counterpropagating laser beams of each sensor from locking together when small angular rates are delivered to such sensor.

BACKGROUND OF THE INVENTION

A laser angular sensor consists primarily of first and second laser beams which are propagated in opposite directions around a path enclosing a rotational sensing axis about which the sensor is to detect and determine angular change. Rotation of the apparatus about that axis changes the effective path length that each beam must travel. The detected frequency difference between the two laser beams is a measure of the angular rate or velocity of the sensor about its sensing axis. The polarity and magnitude of detected frequency change are measures of the direction and magnitude of physical rotation being sensed.

At low rates of rotation of each sensor about its sensing axis, the detected difference in beam frequency becomes disproportional to the rotational rate, and the two counterpropagating laser beams exhibit a single frequency. That condition of no frequency difference in the presence of a small angular rate is called "lock-in".

One apparatus for avoiding the effects of lock-in mechanically oscillates or dithers each laser sensor about its sensing axis. The dither motion is designed to minimize lock-in error and to make each instrument sensitive to small angular velocities.

For navigation of an aircraft, for example, three laser angular sensors are typically arranged with their sensing axes orthogonal to each other and mounted relative to the aircraft on a common platform or instrument block. By sensing the rotational change and rate of change about each of the three orthogonally related axes, angular movement or change in orientation of the vehicle from an initial direction can continuously be determined. To avoid lock-in, each laser angular sensor is supported by springs to allow dither about its sensing axis. Typically each laser receives controlled dithering energy. When the three sensors are mounted on a common instrument block or rigid structure, the individual dithering motions of the sensors are mechanically coupled through the elasticity of the instrument block or structure and their supporting springs. When the instruments are dithered at the same mechanical frequency with appropriate phase angles between the dithering of the three sensors, the mechanical coupling causes the supporting structure or instrument block to wobble, and the wobbling is likely to produce dither-induced coning motion. Because of the misalignment of the instrument sensing axes caused by the coning, significant errors in the navigation system information can occur. Typically, the navigation system delivers earth-position and/or ground velocity of the supporting vehicle, and the delivered information may be in error. Attempts have been made to correct or compensate for coning by using particular circuits in which the coning is sensed, and the output signals from the different laser angular sensors are modified. However, such attempts have not been completely satisfactory.

One such attempt is disclosed in U.S. Pat. No. 4,277,173 which relates to a technique for eliminating frequency and phase differences in the three dither motions.

SUMMARY OF THE DISCLOSURE

In one preferred embodiment of the present invention, four dithering bodies are flexibly mounted to a single instrument block to permit oscillatory mechanical motion in each of the bodies. Three of the dithering bodies are ring laser angular rotation sensors which are flexibly mounted with mutually orthogonal sensitive axes, and each has a dither motion about its sensing axis. The fourth dithering body may be either a fourth ring laser angular rotation sensor or merely a compensating weight. Whether it is a sensor or merely a weight, the fourth dithering body has an axis of dither rotation which is preferably but not necessarily oriented, to form equal angles with the sensing axes of the other three angular rotation sensors. The fourth weight or sensor is positioned and adjusted so that certain angular conditions of dynamic equilibrium are maintained with the other three angular rotation sensors thus relieving the instrument block from net moment and resulting rotational motion. Preferably the dynamic equilibrium is achieved by designing the four dithering bodies to have substantially the same mechanically resonant frequency. In one embodiment of the invention those bodies or dither mechanisms are all driven in an oscillatory dither motion which has substantially equal frequency, phases and selected amplitudes.

Substantial synchronism in the motion of the dithering bodies is achieved by driving all four of them from the same power source, such as a sine wave power source, and by driving the dither mechanisms in substantially the same synchronized phases. Dynamic equilibrium among the four weights may be achieved by selecting the amplitudes of the dither drive signals individually to produce amplitudes of oscillatory motion by their respective dithering bodies so that the vector sum of the angular momenta of the four dithering bodies is substantially zero. Dynamic equilibrium is maintained over a period of time by continuing to drive the dither mechanisms with signals having substantially equal frequency, substantially equal phase and the selected amplitudes.

A second embodiment keeps the mechanically resonant frequencies of the four weights substantially the same, but drives only one of the four dither mechanisms at a time. The dither mechanisms, typically, include flexure springs which torsionally restrain the dither. Such springs may be non-linear. Each of the masses is mounted upon such springs, and the resonant frequencies of dither oscillation are preferably substantially the same. Energizing one of the dither mechanisms by applying an oscillatory torque to its associated weight at its resonant frequency causes that dither mechanism to dither. The dither springs mechanically couple oscillator energy from the energized weight to the supporting structure. Oscillatory energy is transferred from the supporting structure through the dither springs of the other three weights at the common resonant frequency of the four weight-spring dither mechanisms. The other three weights begin to dither and build up amplitudes and phases at the common resonant frequency in their dithers which is nearly correct to cancel the net momenta delivered to the supporting structure.

For best operation of the apparatus, the mechanically resonant frequencies are identical. However, they may differ slightly and still lock together at the driving frequency.

Energy is coupled from the energized dither mechanism to the passive dither mechanisms. The passive mechanisms are dithered by the received energy, but the dithering is not efficient unless the weight-spring combination of the dither mechanism has a high Q. That is, unless the friction is low.

Q is defined as $Q = \frac{1}{2}\zeta$, where $\zeta$ is a damping factor.

Each of the dithered weights has a moment of inertia about its dither axis. Further, the entire combination of four dithered weights and their supporting structure has a moment of inertia which is represented by an inertia tensor. The inertia tensor is measured by a single quantity known as its "norm". It is a part of the invention that energy is most satisfactorily and economically transferred from an energized to a passive dither mechanism when the Q of the passive system multipled by the moment of inertia of the passive system exceeds the above-mentioned inertia tensor norm.

Typically the Q of a dithered ring laser structure and its supporting springs is on the order of 400.

Switches and dither amplifiers are shown herein connecting the dither power source to one, two, or three dither mechanisms at one time. Delivering power to only one dither mechanism at a time is a preferred embodiment, but since another useful embodiment delivers power to all four dither mechanisms, it is apparent that the apparatus operates well with two or three dither mechanisms energized.

Auxiliary to the switches and amplifiers may be sensors which sense that power is being delivered to a particular dither mechanism. In one embodiment, sensors may sense that the dither mechanism is dithering. It is contemplated by this invention that should the one, two or three dither mechanisms fail to receive power, the sensors may cause a switch controller to close another combinations of switches to energize oll or part of the remaining dither drive mechanisms. Alternatively, the switches may be computer-controlled.

It is apparent to those skilled in the art that although mechanical switches are shown in the figures, electronic devices may alternatively be used as switches.

In a preferred embodiment in which only one of the dither drive mechanisms is energized, it is possible, for example, that such drive mechanism may overheat or otherwise fail. In that event, it is contemplated that one dither sensor might sense the situation and send a signal to a switch controller to deliver energy to another dither drive mechanism.

It is also apparent that when less than four dither mechanisms are energized, the switch controller may transfer different permutations and combinations of switches according to a predetermined schedule. If desired, that schedule may also be random.

Dithered ring laser angular rotation sensors are disclosed in U.S. Pat. Nos. 3,373,650 and 3,467,472. One type of known dithering mechanism comprises a flexure with a piezo-electric dither energizing or driving means and/or dither sensing member mounted on the flexure springs. Each ring laser rate sensor in the invention and each compensating mass of the invention may be mounted on such a flexure spring dithering mechanism relative to a common supporting structure or instrument block. The instrument block, in turn, may be mounted upon shock mounts relative to a supporting vehicle. Typically the mechanically resonant frequency of the shock mount with its supported weight is very low (for example, 60 hertz) compared to the mechanically resonant frequency of the dithered weights or ring lasers relative to the instrument block (for example, 400 hertz).

DESCRIPTION OF PREFERRED EMBODIMENTS

Figure 1:
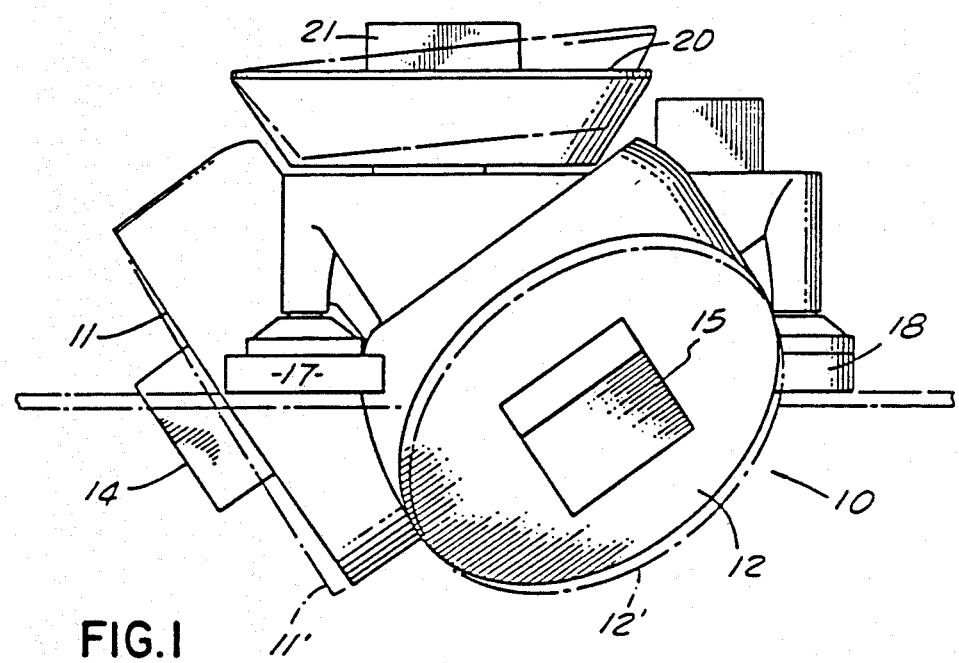
FIG. 1 is a side elevational view of an instrument block showing three laser angular sensors being stabilized according to the described method and apparatus.
Figure 2:
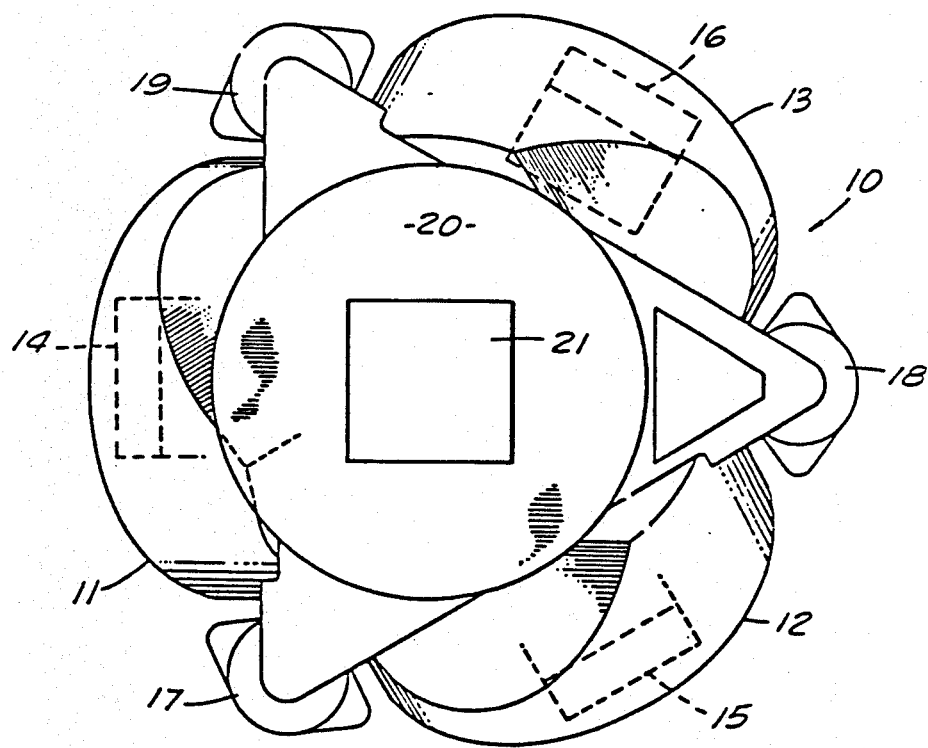
FIG. 2 is a top plan view of the instrument block of FIG. 1.

In FIGS. 1 and 2, a one-piece instrument block 10 includes planar surfaces 11, 12, and 13 which are preferably flat surfaces precisely arranged to be mutually orthogonal to serve as mounting surfaces for three individual laser angular sensors 14, 15, 16, respectively. The surfaces are labeled in FIG. 2, but only one is shown in face view in FIG. 1. Only laser sensors 14 and 15 are shown in FIG. 1. The sensors are shown dashed in FIG. 2, for they are hidden from view in that figure. Instrument block 10 is common supporting structure for the sensors 14–16.

The block or structure 10 is supported relative to a vehicle, for example, by three legs, isolators or pedestals 17, 18, 19 which are shown clearly in FIG. 2.

The isolators 17, 18, 19 are of the spring-damper type. Typically the resonance frequency of such isolators, with their supported weight, is on the order of sixty hertz. The instrument block, and ring laser angular sensors mounted thereon, are thereby secured to the aircraft or other vehicle whose movement is to be monitored. That is, the three laser angular sensors are all mounted on a common base or instrument block 10 with each sensor sensing angular movements about a sensing axis which is orthogonal to the plane of the surface to which it is mounted. It is known that by such a combination of three angular sensors, a vehicle carrying the instrument block and sensors mounted thereon is capable of operating in three dimensions with any angular movement of the vehicle about any of the three axes detected by one or more of the sensors.

In conventional manner, each of the ring laser sensors 14, 15, 16 includes a pair of ring laser beams in respectively opposite or counterpropagating directions in a closed path about its sensing axis and means for measuring the difference frequency of the laser beams. Additionally, as a preliminary requirement for the described method and apparatus, each of the laser sensors is supported by dither spring means 14a, 15a, 16a, respectively, relative to the block 10 for an oscillatory torsional mechanical movement or dither of the ring laser angular sensors relative to the instrument block or structure. The dither motion is, in each instrument, about that instrument's sensing axis to prevent or minimize lock-in of the beams of the rate sensor at low rates of to-be-measured rotation.

Each sensor is dithered to avoid one problem, i.e., lock-in of the frequencies of the ring laser counterpropagating beams, but because of dithering of three sensors against the instrument block, without dither compensation, coning of the sensing axes occurs. Dither motion of one sensor which is sensed by another sensor produces an error in the output signal of that receiving sensor.

The angular sensors with mechanical dithering means discussed to this point are of conventional construction and operation, and, therefore, need not further be described.

Figure 3:
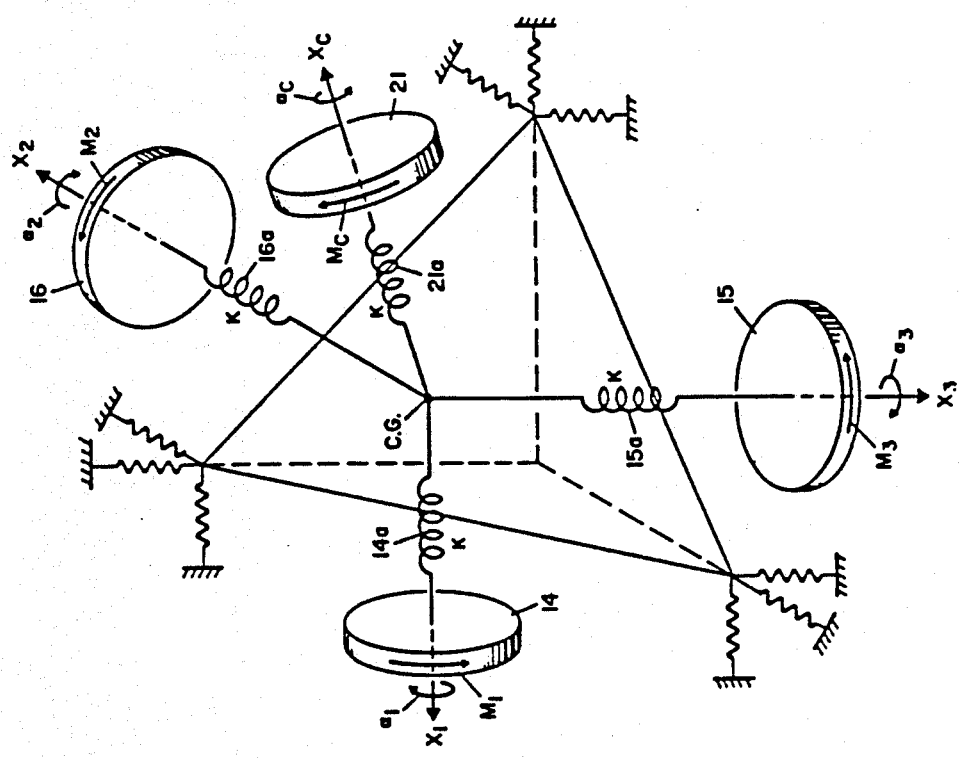
FIG. 3 is a schematic representation depicting pertinent motions and moments acting on the apparatus of FIG. 1.

A fourth dither axis $X_c$ is shown on the instrument block in the schematic diagram of FIG. 3. It should be noted that the four axes need not intersect, but they are shown intersecting for ease of description. For simplicity, the instrument block is depicted in FIG. 3 by solid lines. In a first embodiment of the coning compensation of this invention, a weight 21 has an axis of dither rotation $X_c$ and a spring 21a for supporting the weight 21 for dithering about the axis $X_c$ relative to the block 10.

In one embodiment, the dither axis $X_c$ is orthogonal to surface 20 and forms equal angles with all three sensing axes of the three sensors 14, 15, 16. The dither angular momentum of the compensating weight 21 about axis $X_c$, when resolved into components along each of the sensing axes $X_1$, $X_2$, and $X_3$ of the sensors 14, 15, 16, balances the dithering angular momenta of the sensors 14, 15, 16 so that the vector sum of all four angular momenta are substantially zero.

In one embodiment, dither torques are simultaneously delivered to the three sensors 14, 15, 16 about their sensing axes $X_1$, $X_2$, $X_3$ and to the weight 21 about axis $X_c$ in amplitude, frequency and phase to cause the vector sum of such torques to be zero.

For ensuing analysis, refer to the schematic representation of FIG. 3. The following assumptions simplify the analysis. To the extent that a system does not satisfy the assumptions, the coning errors may be reduced rather than be eliminated.

For example, it is assumed that the mechanical velocity resonance frequencies of the weigth-spring systems are equal. If they are not exactly equal, the sensing axes may cone slightly, but the errors are reduced below those observed without the fourth weight. A typical resonant frequency of the dithered weights or ring laser sensors is 400 hertz.

It is also assumed that the axis $X_c$ forms equal angles to the axes $X_1$, $X_2$, $X_3$. To the extent that the angles are not equal, the dither amplitudes of the sensors are not equal which may affect uniformity in lock-in control.

It is further assumed that the weights of the ring lasers are equal and that the spring constants are equal. To the extent that this is not true, there may be some residual coning errors.

It is likewise assumed that the springs 14a, 15a, 16a are linear. Non-linearities may introduce errors.

It is also assumed that the Q of the weights and their supporting springs, where $Q = \frac{1}{2}\zeta$, are high and nearly equal. Variance from these characteristics may introduce coning error. $\zeta$ is the damping factor of a particular weight-spring-damper combination.

The dithered ring laser angular sensors are depicted as cylindrical weights having respective dithering moments $M_1$, $M_2$ and $M_3$ of nearly equal phase and amplitude; the corresponding dithering rotation angles are $\alpha_1$, $\alpha_2$, and $\alpha_3$. The compensating weight moment is $M_c$ and the corresponding dithering angle of rotation of the compensating weight is $\alpha_c$.

It is accurate to assume that the dither produces only small angles of rotation. The dynamic equations of dither rotation, in Cartesian tensor notation, of the instrument block, angular sensors and compensating weight are:

$$(I_{ij} - I\delta_{ij} - I_c n_i n_j)\ddot{\theta}_j + K(\theta_i - \alpha_i) + K_c(\theta_j n_j - \alpha_c)n_i + K_{ij}\theta_j = M_i + M_c n_i \quad (1)$$

$$I\ddot{\alpha}_i + K(\alpha_i - \theta_i) = -M_i \quad (2)$$

$$I_c \ddot{\alpha}_c + K_c(\alpha_c - \theta_j n_j) = -M_c \quad (3)$$

Where,
$\theta_i$ = rotation angles of the instrument block or supporting structure 10, about axes $X_i$, where i equals 1, 2, 3.
$\alpha_i$ = rotation angle of angular sensors 14, 15, 16, about axes $X_i$, where i equals 1, 2, 3.
$\alpha_c$ = rotation angle of compensating weight 21, about axis $X_c$.
$M_i$ = the moment of angular sensors 14, 15, 16 about their respective axes $X_i$, where i equals 1, 2, 3.
$M_c$ = the moment of the compensating weight 21 about the $X_c$ axis.
$I_{ij}$ = moment of inertia matrix of the entire assembly including the sensors 14, 15, 16, the compensating weight 21, and the instrument block or supporting structure 10, where i = 1, 2, 3 and j = 1, 2, 3.
I = the amplitude of the moment of inertia of each angular sensor 14, 15, 16 about its dither axis $X_i$, where i = 1, 2, 3.
$I_c$ = the amplitude of the moment of inertia of the compensating weight 21 about its dither axis $X_c$.
$n_i$ = compensating weight axis cosine angles relative to the orthogonal dithering axes, $X_i$, where i = 1, 2, 3.
$K_{ij}$ = angular stiffness coefficients of the supporting structure, including springs 14a, 15a, 16a and the instrument block 10 about the center of weight of the instrument block.
K = rotational spring constant of the compensating weight.
$K_c$ = rotational spring constant of the dithered compensating weight.

The kronecker delta $\delta_{ij} = 1$, when i = j, and $\delta_{ij} = 0$, when i ≠ j Where all angles are measured with respect to fixed coordinates on the supporting structure, and all moments of inertia are calculated relative to the center of weight of each respective item.

It is further assumed that the elastic center of the supports coincide with the center of weight, and in that way it secures separation of rotation from translation. In a system where the right hand side of equation (1) is constrained to vanish, $$(I_{ij} - I\delta_{ij} - I_c n_i n_j)\ddot{\theta}_j + K(\theta_i - \alpha_i) + K_c(\theta_j n_j - \alpha_c) n_i + K_{ij} 74_j = 0 \tag{4}$$

Multiplying equation (3) by $n_i$ and adding to (2), results in, (because $M_i + M_c n_i = 0$)

$$I\ddot{\alpha}_i + I_c \ddot{\alpha}_c n_i + K(\alpha_i - \theta_i) + K_c(\alpha_c - \theta_j n_j) n_i + 0 \tag{5}$$

In case of $K_c/I_c = K/I$, equations (4) and (5) are a set of six homogeneous equations for the three unknown $\theta_i$ and three unknown $(I\alpha_i + I_c \alpha_c n_i) = 0$. The steady state solution of these equations is, $$\theta_i = 0, \ I\alpha_i + I_c \alpha_c n_i = 0 \tag{6}$$

This last relation also yields $$I\dot{\alpha}_i + I_c \dot{\alpha}_c n_i = 0 \tag{7}$$

Namely, the vector sum of all the angular momenta of the dithers is substantially zero. To summarize the analysis, the following correspondence is set forth:

When $K_c/I_c = K/I$, upon setting $M_i + M_c n_i = 0$, then $\theta_2 = 0$ (which means there is no motion of the block) and $I\alpha_i + I_c \alpha_c n_i = 0$, and, vice versa. Upon setting $I\dot{\alpha}_i + I_c \dot{\alpha}_c n_i = 0$, it follows that $\theta_i = O$ and $M_i + M_c N_i = O$. (The vector sum of the moments is substantially zero) This reverse relationship can be demonstrated following the same derivation shown above. The condition $$K_i/I_c = K/I$$

determines that the four dither mechanisms have substantially the same natural frequency relative to the stationary instrument block.

This result demonstrates the elimination of coning and errors resulting therefrom.

The moment of the fourth dither is given by $$M_c = \sqrt{M_1^2 + M_2^2 + M_3^2}$$

Where the orientation of the fourth dither axis relative to the three other dither axes is defined in terms of the angle cosines.

$$n_1 = -M_1/M_c, \ n_2 = -M_2/M_c, \ n_3 = -M_3/M_c$$

From the analysis, it is clear that the selectively adjustable torsion spring means 21a for supporting the compensating weight for dithering can be adjusted to a prescribed dither amplitude, frequency and phase that compensates for mechanical coupling of the dithering of laser sensors 14, 15, 16 to reduce, and possibly eliminate, coning errors.

Although as an initial simplifying condition in derivation of the dynamic equations, it was assumed that the mounting plane 20 for the compensating weight intersects the sensor mounting planes 11, 12, 13 at the same angle, it is emphasized that this is not necessary, and the angles of intersection with the different planes can differ. That is, the angles between the axis of dither of the compensating weight 21 and the dither sensing axes of the ring lasers need not be equal. In FIG. 1 the compensating plane, in dashed line, is skewed from the original plane 20 and, therefore, clearly intersects the respective planes 11, 12, 13 in angles that are substantially different.

It is possible to change the compensating weight, the compensating weight dithering amplitude, or a combination thereof. However, the simplest and most direct construction is to make the compensating weight identical to that of a sensor, and to adjust the compensating weight dither amplitude; frequency and phase to be substantially identical to those of the three ring laser sensors.

Figure 4:
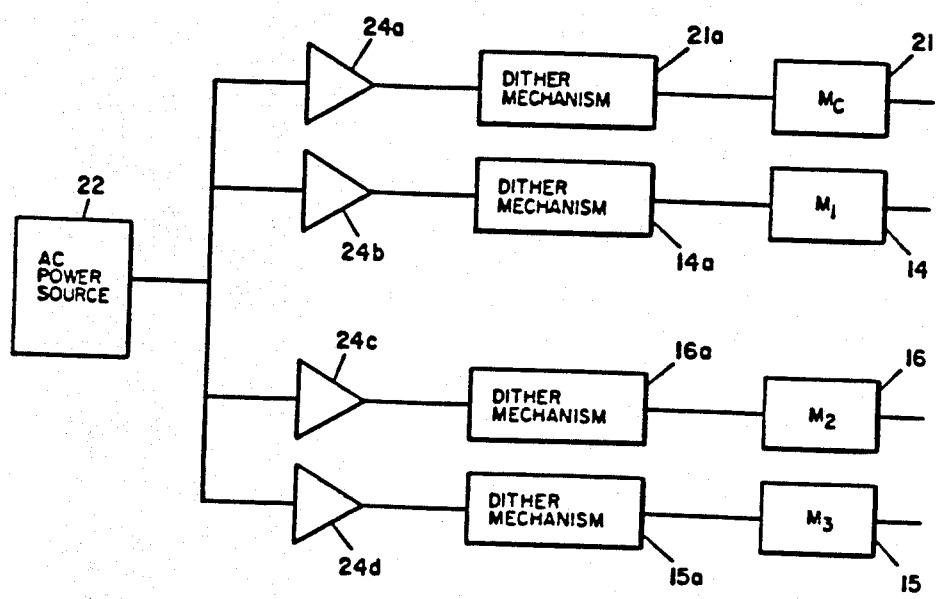
FIG. 4 is a functional block diagram of one preferred compensating weight dithering control and energizing apparatus.

FIG. 4 illustrates a block diagram of a circuit for separately adjusting the frequency, amplitude and phase of the compensating weight dithering means.

In the first described embodiment the instrument block included three mutually perpendicular planar surfaces 11-13 on which the laser angular sensors are mounted. The mounting surface 20, for mounting the compensating weight, intercepts each of the surfaces 11-13 at the same angle.

In a second described version the mounting surface 20 intercepts the surfaces 11-13 at different angles. It is further contemplated that the surfaces 11-13 may be angularly arranged other than mutually perpendicular, and such non-perpendicular arrangement is depicted in FIG. 1 by the dashed line surfaces 11' and 12'.

The analytical basis for the embodiment wherein the surfaces 11', 12', and 13' are non-perpendicular follows. The surface 13' is not shown in the Figures, but it corresponds to the surface 13 except that it does not form a perpendicular set with surfaces 11' and 12'. For the analysis, use an affine system of coordinates with the rotation dithering axis of the compensating weight and the rotation dithering and sensing axes of the sensors each normal to a respective plane of surfaces 11',12', 13' and 20'. In an affine system of coordinates, subscripts and superscripts identify covariant and contravariant components. Using the same notation as in the previously described embodiments, $$(I_i^j - I\delta_i^j - I_c n^i n_j)\ddot{\theta}^j + K(\ddot{\theta}^i - \alpha^i) + K_c(\theta^j n_j - \alpha_c)n^i + K_j^i \theta^i = M^i + M_c n^i$$

$$I\ddot{\alpha}^i + K(\alpha^i - \theta^i) = -M^i$$

$$I_c \ddot{\alpha}_c + K_c(\alpha_c - \theta^i n_i) = -M_c$$

Where the inertia and stiffness mixed tensors are defined as follows:

$$I_i^j = \int (r^2 \delta_i^j - y_i y^j) dm; \ K_i^j = \sum_n k_n(r_n^2 \delta_i^j - y_{n,i} y_n^j)$$

$y^i$ is measured along the affine axes
$y_i$ is derived from the relation
$K_n$ is the spring constant of a single isolator $$y_i = g_{ij} y^j$$

where $g_{ij}$ are the covariant metric tensor components.

The equations of motion in oblique axes embodiment (i.e., 11'-13' not mutually perpendicular), when using affine coordinates and written in covariant components, are algebraically identical to the equations of motion for the orthogonal axes embodiment (equations (1), (2) and (3)). The dynamic coning compensation which was shown for the embodiment with orthogonal axes of mutually perpendicular ring laser gyros can then be inferred in the embodiment with oblique axes. More specifically, the vector sums of the previously defined dither moments and torques are substantially zero. The vector sum of the previously defined angular momenta is zero, and all four dither mechanisms have substantially the same natural frequency relative to the stationary instrument block.

The coning compensation means 21 comprises in its most general aspect a weight of indiscriminate character and means for dithering the weight in the manner described earlier herein. An especially advantageous embodiment of the compensation means 21 is achieved by mounting a redundant fourth laser sensor and dithering means on the flat surface 20. Not only does such construction operate satisfactorily to compensate for dither of the other ring laser gyros about their sensing axes, but also the redundant laser sensor is readily and advantageously used as an active laser angular sensor, replacing any one of the other three laser sensors 14–16.

In FIG. 4 there is shown a functional block diagram of one circuit for generating electrical signals for oscillating the dither mechanisms 14a, 15a, 16a, and 21a. AC power source 22 typically comprises an oscillator circuit which generates a substantially sinusoidal signal. In one preferred embodiment, the frequency of the signal generated by source 22 is approximately equal to each of the natural resonant frequencies of dither mechanisms 14a, 15a, 16a, and 21a. Amplifiers 24a, b, c, and d each amplify this signal and deliver it to dither mechanisms 14a, 15a, 16a, and 21a. Preferably amplifiers 24a, b, c and d are configured so that the frequency and phase of the sine wave signal from surce 22 are not altered. The gain of each amplifier can be set separately to deliver different amplitudes of dither motion for each dither mechanism and the respective moments and torques $M_1$, $M_2$, $M_3$ and $M_c$ to cancel coning.

Figure 5:
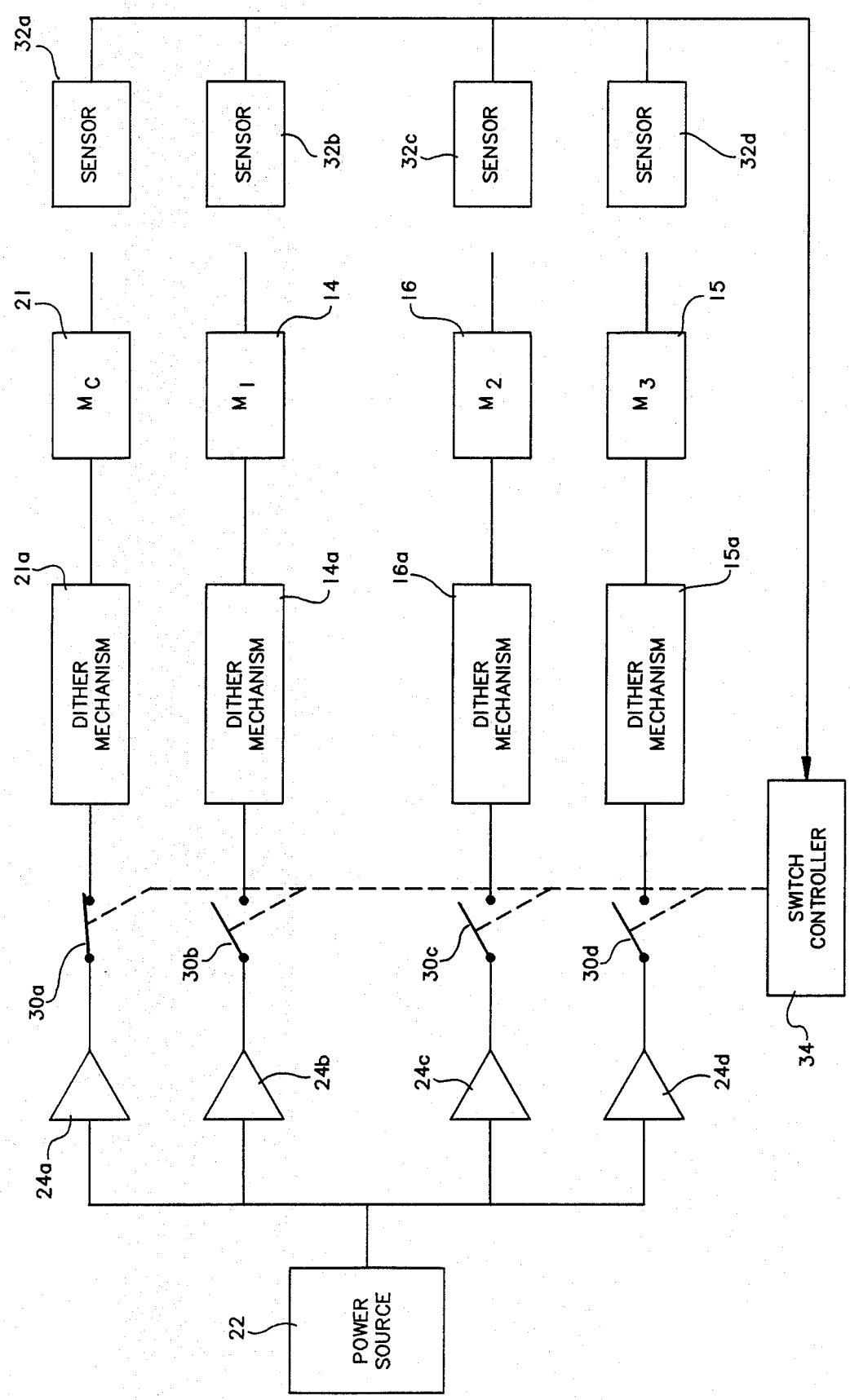
FIG. 5 is a functional block diagram showing how FIG. 4 may be altered to operate with less than four energized dither drive mechanisms.

FIG. 5 shows a typical control circuit for use wherein the dither of only one, two or three mass dithers are energized. The energized weight or weights may be the compensating weight or any one of the three ring laser sensors.

Energizing only one of the dither motions, wherein the mechanically resonant frequencies of the weights and their dither springs are substantially the same, may cause dithering to build in each of the four weight-spring combinations until the vector sum of the momenta and torques of the four weight-spring combinations are zero.

It is contemplated by this new embodiment that should the drive mechanism of any one of the weight-spring combinations become defective, dither drive means on any one or more of the other weight-spring combinations could be used.

Switching the drive energizing from one or more weight-spring combinations to other combinations is as simple as opening and closing the switches 30a, 30b, 30c, 30d.

It is further contemplated by this invention that the opening and closing of the switches 30a, 30b, 30c, 30d could achieved by a computer (not shown).

It is likewise contemplated by this invention that the switches 30a, 30b, 30c, 30d could be electronic switches instead of mechanical switches.

Thus, it is further contemplated that the dither mechanisms can be energized one, two, or three at a time in all combinations and permutations.

It is likewise contemplated by this invention that the switches 30a–d can be switched in a predetermined timed sequence. They can also be switched in a random timed sequence. It follows, therefore, that they can be switched in a pseudo-random time sequence.

It is instructive to include analysis of illustrative embodiments of the invention.

When three ring laser gyros have their sensing axes forming an orthogonal set of axes, and the compensating weight dither axis forms an equal angle with each axis of the orthogonal set, analysis of the structure is simplified. Analysis is further simplified if the ring laser gyros have identical structures and supporting dither springs. It is further desirable that all four weights with their supporting springs have the same velocity resonance frequency. With those assumptions, consider the following equations wherein only the compensating weight is energized.

The basic equation of motion, using the above-defined variables, is:

$$(I_{ij} - I\delta_{ij} - I_c n_i n_j)\ddot{\theta}_j + K_{ij}\theta_j + K(\theta_i - \alpha_i) + K_c(\theta_j n_j - \alpha_c)n_i = M_c n_i$$

$$I\ddot{\alpha}_i + K(\alpha_i - \theta_i) = 0$$

$$I_c \ddot{\alpha}_c + K_c(\alpha_c - \theta_i n_i) = -M_c$$

Because of the assumption that the velocity resonance frequencies, $\omega_o$, of the four weights and their supporting springs are equal, $$K/I = K_c/I_c = \omega_o^2(1 + 2i\zeta),$$

wherein $\zeta$ is a damping factor. Q is defined as $Q = \frac{1}{2}\zeta$. Note that $K_{ij}$ is complex, and it includes both a spring constant and a friction factor.

In the frequency domain ($\omega$), when $\omega = \omega_o$, the above equations of motion are reduced to $$(K_{ij} - \omega^2 I_{ij})\theta_j - K\alpha_i - K_c n_i \alpha_c = M_c n_i$$

$$2i\zeta\alpha_i - \theta_i = 0$$

$$2i\zeta\alpha_c - \theta_i n_i = -M_c/I_c\omega^2$$

From the second and third of these equations, $$\alpha_i = \theta_i/2i\zeta = -iQ\theta_i$$

and $$\alpha_c = -iq(\theta_j n_j - M_c/I_c\omega^2) \text{ and}$$

$$(K_{ij} - \omega^2 I_{ij})\theta_j + iQ\omega^2(I\delta_{ij} + I_c n_i n_j)\theta_j = M_c(1 + iQ)n_i$$

A typical Q is on the order of 400.

For $Q \gg 1$, and $Q \| I\delta_{ij} + I_c n_i n_j \| \gg \| I_{ij} \|$, the equation of motion is further reduced to $$(I\delta_{ij} + I_c n_i n_j)\theta_j = M_c n_i/\omega^2$$

But $n_i = \sqrt{3}/3$ for equal angles between the dither axis of the compensating weight and the orthogonal set of sensing axes.

whence $$(I + I_c)\theta_i = (M_c/\omega^2)(\sqrt{3}/3)$$

Solving for $\theta_i$, $\alpha_i$ and $\alpha_c$ $$\theta_i = (M_c/(I + I_c)\omega^2)(\sqrt{3}/3)$$

$$\alpha_i = -iQ(\sqrt{3}/3)(M/(I + I_c)\omega^2$$

$$\alpha_c = -iq((M_c/(I + I_c)\omega^2) - (M_c/I_c\omega^2))$$
$$= iQ(I/I_c(I + I_c)(M_c/\omega^2)$$

If this analysis is further constrained to $I = I_c$, then $$\alpha_i = -(iQ/2)(\sqrt{3}/3)(M/I\omega^2)$$

$$\alpha_c = (iQ/2)(M/I\omega^2)$$

and $$(I_c\alpha_c)n_i = I\alpha_i$$

$$\theta_i + (i/Q)\alpha_i = (1/2)(\sqrt{3}/3)(M/I\omega^2)$$

which suggests that, for high Q, $|\theta_i| << |\alpha_i|$, and angular momentum balance is, to the first order of approximation, conserved.

Although the invention has been described in detail above, it is not intended that the invention shall be limited by the description, but only according to the spirit and scope of the appended claims supported by the description in the specification and drawings.

We claim:

1. In combination:
   at least three ring laser angle sensors, having non-coaxial sensing axes, for sensing angulat motions, each having an operative laser part and a mounting part with freedom of angular vibration between said parts, said mounting parts of said sensors being rigidly attached together to form an instrument block, further including at least three angular sensor dithering means, one on each of said sensors, respectively, for mechanically dithering said operative portion of each said sensor about its sensing axis, at a prescribed frequency, emplitude and phase, relative to said block;
   a compensating weight, mounted upon said instrument block with freedom of angular vibration, relative to said block, about a dither axis that has components in the directions of each of said sensing axes;
   compensating weight dithering means for mechanically dithering said compensating weight about said dither axis at a prescribed frequency, amplitude, and phase to reduce rotational vibration of said block; and
   said three ring laser angle sensors being substantially identical and mounted with mutually orthogonal sensing axes for sensing rotations about said sensing axes, and said compensating weight being mounted with said dither axis at prescribed angles relative to each of said sensing axes.

2. The device a claimed in claim 1 wherein said compensating weight has a moment of inertia substantially equal to the moment of inertia of the dithering portion of each of said sensors and is mounted on said block with said dither axis equiangularly directed relative to each sensing axis of each said sensor.

3. The device as claimed in claim 1, in which each of said angular sensor dithering means angular vibrates at substantially the same frequency, amplitude, and phase; the dithering of said dithering means on said compensating weight is at substantially the same frequency and phase as that of each angular sensor dithering means, and the dithering amplitude of said compensating weight is adjusted to produce a vector sum, of said dithering torques of said sensors and said compensating weight, which is equal to substantially zero, and to produce a vector sum, of the angular momenta of said dithered sensors and said compensating weight, which is equal to substantially zero.

4. Ring laser sensing apparatus, comprising:
   a unitary instrument block having three mounting surfaces for mounting ring lasers;
   three ring laser angle sensors mounted, with their sensing axes non-parallel, on respective mounting surfaces of said instrument block;
   separate dithering means associated with each ring laser angle sensor for angularly dithering each sensor, relative to said block, about its sensing axis;
   a compensating weight mounted for angular vibration, about a dithering axis, having components in the directions of the sensing axes of said sensors, relative to said instrument block; and
   selectively adjustable means for angularly dithering said compensating weight, at a prescribed amplitude, frequency, and phase, about its said dithering axis.

5. The device as claimed in claim 4, in which said ring laser angle sensors are substantially identical and are mounted with mutually orthogonal sensing axes, and said compensating weight is mounted with its said dithering axis at a prescribed angle relative to each of said sensing axes.

6. The device as claimed in claim 5 wherein the moment of inertia of said compensating weight is substantially equal to the moment of inertia of each of said sensors, and said compensating weight is mounted on said block with its said dithering axis equiangularly directed relative to each sensing axis of each said sensor.

7. In combination:
   at least three ring laser angle sensors mounted together with orthogonal sensing axes to form an instrument block for sensing angular motion, each said ring laser having an operative laser part that has angular freedom to vibrate about its sensing axis relative to said instrument block, and further including means for mechanically dithering said operative part of each sensor, relative to said instrument block, about its sensing axis at prescribed frequencies, amplitudes, and phases;
   a compensating weight mounted upon said block for angular vibration relative to said block about a dither axis which has components in the directions of all of said sensing axes; and
   means for angularly mechanically dithering said compensating weight, relative to said block, about said dither axis at a prescribed frequency, amplitude and phase to reduce rotational vibration of said instrument block; and
   said three ring laser angle sensors which are substantially identical for sensing rotations about said sensing axes, and said compensating weight is mounted with its axis of rotation at prescribed angles relative to each of said sensing axes.

8. The device as claimed in claim 7 wherein said compensating weight has a moment of inertia about its sensing axis of the dithered part of each of said sensors and is mounted on said block with said dither axis equiangularly directed relative to each sensing axis of each said sensor.

9. The device as claimed in claim 7, in which each of said angular sensor dithering means angularly vibrates at substantially the same frequency, amplitude, and phase, and said compensating weight is angularly vibrated at substantially the same said frequency, and phase as that of each of said angular sensor dithering means, and the dithering amplitude of vibration of said compensating weight is adjusted to produce a vector sum of the dithering torques, of said dithered sensors and said compensating weight, which is equal to substantially zero, and to produce a vector sum of the angular momenta, of said dithered sensors and said compensating weight, which is equal to substantially zero.

10. In combination:
an elastic block;
first, second, third and fourth weights;
first, second, third and fourth spring means which are each mounted to support said weights, respectively, with limited angular rotational spring-constraint about first, second, third and fourth non-coaxial dither axes, respectively, relative to said block;
one energized dither mechanism connected to deliver vibrational dither energy to only one said weight, to cause each said one weight to vibrate angularly on its said support spring means about its said dither axis at a predetermined frequency to reduce rotational motion of said block.

11. Apparatus as recited in claim 10 wherein each combination of one of said weights and its said supporting spring means has substantially the same predetermined mechanically resonant frequency.

12. Apparatus as recited in claim 11 in which said first, second, and third weights are ring laser angle sensors, the amplitudes and frequencies of angular vibrations of said sensors about their sensing axes being sufficient to avoid lock-in of said sensors and wherein at least two energized dither mechanisms are connected to deliver vibrational dither energy to respective sensors at a predetermined frequency, amplitude and phase to reduce rotational motion of said block.

13. Apparatus as recited in claim 12 in which at least one energized dither mechanism is connected to deliver vibrational dither energy to cause angular vibration of said fourth weight about its dither axis.

14. Apparatus as recited in claim 13 in which there is only one said energized dither mechanism, it delivers energy to said fourth weight, and each of said weights together with its said supporting spring means has a high Q factor.

15. Apparatus as recited in claim 12 in which said dither axes of said angle sensors are orthogonal, and the dither axis of the said fourth weight is directed to form equal angles with the dither axes of said sensors.

16. Apparatus as recited in claim 12 in which there is only one energized dither mechanism, connected to drive only one of said weights about its dither axis, and the rest of said weights are dithered by mechanical, elastic coupling through said block and said spring means, all of said weights and their supporting spring means having a high Q factor.

17. Apparatus as recited in claim 12 in which said angle sensors are substantially equal in mass and moment of inertia about their dither axes, and their said supporting spring means are substantially identical.

18. Apparatus as recited in claim 12 in which said dither axes of said angle sensors are orthogonal.

19. Apparatus as recited in claim 16 in which said one energized dither mechanism is consecutively connected to dither different ones of said weights.

20. Apparatus as recited in claim 19 in which the connection of said energized dither mechanism to different ones of said weights follows a predetermined timed sequence.

21. Apparatus as recited in claim 20 in which the connection of said energized dither mechanism to different ones of said weights follows a pseudo-random sequence.

22. Apparatus as recited in claim 19 in which the connection of said energized dither mechanism to different ones of said weights follows a random sequence.

23. Apparatus as recited in claim 19 in which the connection of said energized dither mechanism to different ones of said weights is transferred in response to commands.

24. Apparatus as recited in claim 10 in which only two dither mechanisms are energized, each connected to dither a different one of said weights with predetermined amplitudes, frequencies and phases, the remainder of said weights being dithered by mechanical elastic coupling to said two weights through said elastic block and said spring means, each of said weights and said supporting spring means having a high Q factor.

25. Apparatus as recited in claim 24 in which said two energized dither mechanisms are connected in a timed sequence to dither different permutations and combinations of said weights.

26. Apparatus as recited in claim 25 in which the said two energized dither mechanisms are connected in a pseudo-random sequence to dither different permutations and combinations of said weights.

27. Apparatus as recited in claim 24 in which said two energized dither mechanisms are connected in a random sequence to dither different permutations and combinations of said weights.

28. Apparatus as recited in claim 24 in which said two energized dither mechanisms are connected in response to a command to dither different permutations and combinations of said weights.

29. Apparatus as recited in claim 10 in which there are only three energized dither mechanisms, each connected to dither a different one of said weights in predetermined amplitudes, frequencies, and phases, the remaining said weight being dithered by mechanical coupling through said elastic block and said spring means to said three weights, each said weight and its supporting spring means having a high Q factor.

30. Apparatus as recited in claim 29 in which said three energized dither mechanisms are connected in a predetermined timed sequence to dither different permutations and combinations of said weights.

31. Apparatus as recited in claim 30 in which said three energized dither mechanisms are connected in a pseudo-random sequence to dither different permutations and combinations of said weights.

32. Apparatus as recited in claim 29 in which said three energized dither mechanisms are connected in a random sequence to dither different permutations and combinations of said weights.

33. Apparatus as recited in claim 29 in which said three energized dither mechanizations are connected in response to a command to dither different permutations and comnbinations of said weights.

34. In combination:
an instrument block;
three ring laser angle sensors, having different non-parallel sensing axes, mounted on said instrument block;
first, second, and third dither mechanism means, including support springs, one for each sensor, for independently angularly mechanically dithering each of said angle sensors about its said sensing axis relative to said block;
a compensating weight mounted on said instrument block;
fourth dithering mechanism means, including a support spring, for supporting said compensating weight to allow dithering of said compensating weight, about a dither axis, that is non-perpendicular to said sensing axes, relative to said block at a prescribed frequency, amplitude and phase to reduce rotational vibration of said block during the mechanical dithering of said ring laser angle sensors.

35. The device as claimed in claim 34, in which said first, second, and third means for mechanically dithering angularly vibrates at substantially the same frequency, amplitude and phase, and the angular dithering of said fourth means for mechanically dithering vibrates at substantially the same frequency and phase as that of said first, second, and third means for mechanically dithering, the dithering amplitude of angular vibration of said compensating weight being adjusted to cause the vector sum of the dithering torques of said sensors, together with said compensating weight, to be equal to substantially zero, and to cause the vector sum of the angular momenta of said dithered sensors, together with said compensating weight, to be equal to substantially zero.

* * * * *